(12) United States Patent
Chung et al.

(10) Patent No.: US 12,474,390 B2
(45) Date of Patent: Nov. 18, 2025

(54) APPARATUS AND METHOD ESTIMATING BREAKDOWN VOLTAGE OF SILICON DIOXIDE FILM USING NEURAL NETWORK MODEL

(71) Applicant: SAMSUNG ELECTRONICS CO., LTD., Suwon-si (KR)

(72) Inventors: Bumsuk Chung, Hwaseong-si (KR); Hakgyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 566 days.

(21) Appl. No.: 17/509,551

(22) Filed: Oct. 25, 2021

(65) Prior Publication Data
US 2022/0236313 A1 Jul. 28, 2022

(30) Foreign Application Priority Data
Jan. 26, 2021 (KR) .................. 10-2021-0011032

(51) Int. Cl.
*G01R 31/12* (2020.01)
(52) U.S. Cl.
CPC .................. *G01R 31/129* (2013.01)
(58) Field of Classification Search
CPC .... G01R 31/00; G01R 31/12; G01R 31/1227; G01R 31/1263; G01R 31/129;
(Continued)

(56) References Cited

U.S. PATENT DOCUMENTS 5,420,513 A 5/1995 Kimura
6,326,792 B1 12/2001 Okada
(Continued)

FOREIGN PATENT DOCUMENTS

JP H05264645 A 10/1993
JP 3644284 B2 4/2005
(Continued)

OTHER PUBLICATIONS

Chen, et al. "Breakdown voltage prediction of SOI lateral power device using deep neural network," 2019 Cross Strait Quad-Regional Radio Science and Wireless Technology Conference (CSQRWC), IEEE 2019. (Year: 2019).*
(Continued)

*Primary Examiner* — Catherine T. Rastovski
*Assistant Examiner* — Matthew W. Baca
(74) *Attorney, Agent, or Firm* — Sughrue Mion, PLLC

(57) ABSTRACT

A method of estimating a breakdown voltage of a silicon dioxide film includes; generating breakdown voltage information associated with first test dies selected from among test dies, generating a breakdown voltage estimation model by updating a parameter of a neural network model based on the breakdown voltage information, applying test voltages to second test die selected from among the test dies and distinct from the first dies and receiving currents levels for current generated by the second test dies in response to the test voltages, wherein the test voltages have respective levels lower than levels of breakdown voltages for the first test dies, and estimating breakdown voltages of the second test dies using the breakdown voltage estimation model in relation to the currents levels.

20 Claims, 14 Drawing Sheets

(58) Field of Classification Search
CPC .... G01R 31/14; G01R 31/26; G01R 31/2601;
G01R 31/261; G01R 31/2621; G01R
31/2623; G01R 31/2648; G01R 31/2642;
G01R 31/2851; G01R 31/2855; G01R
31/2858; G01R 31/31835; G01R
31/318357; G01R 31/318508; G01R
31/318511; G01R 31/2817; G01R
31/3004; G01R 31/2846; G01R 31/2848;
G01R 31/2849; G01R 31/2836; G01R
31/2856; G05B 2219/33044; G06N 20/00;
G06N 20/10; G06N 20/20; G06N 3/02;
G06N 3/08; G06N 3/09; H01L 22/00;
H01L 22/14; H01L 22/20; G06F 30/27
See application file for complete search history.

(56) References Cited

U.S. PATENT DOCUMENTS

| | | |
|---|---|---|
| 6,525,544 B1 | 2/2003 | Okada |
| 6,756,806 B1 | 6/2004 | Yang et al. |
| 2007/0059850 A1* | 3/2007 | Zhao ................ G01R 31/2623 438/14 |
| 2008/0174334 A1* | 7/2008 | Chanda ................ G06F 30/20 716/112 |
| 2008/0309365 A1* | 12/2008 | Liao ................ G01R 31/2858 324/762.09 |
| 2022/0057365 A1* | 2/2022 | Claudio ............ G01N 33/2045 |
| 2022/0207351 A1* | 6/2022 | Sarkar ................ G06N 3/042 |

FOREIGN PATENT DOCUMENTS

| | | |
|---|---|---|
| JP | 4179003 B2 | 11/2008 |
| KR | 10-1999-0084574 A | 12/1999 |

OTHER PUBLICATIONS

Stratigopoulos, "Machine learning applications in IC testing," 2018 IEEE 23rd European Test Symposium (ETS), Bremen, Germany, 2018, pp. 1-10. (Year: 2018).*

* cited by examiner

FIG. 10

| INX | THK | X | Y | INPUT DATA |  |  |  |  |  | OUTPUT DATA |
|---|---|---|---|---|---|---|---|---|---|---|
|  |  |  |  | $V_1$ | $V_2$ | $V_3$ | ... | $V_{k-1}$ | $V_k$ | VBD |
| 1 | 50.1 | 1 | 2 | 6.98E-11 | 5.2E-11 | 4.32E-11 |  | 3.35E-11 | 3.08E-11 | $V_1$ |
| 2 | 49.9 | 2 | 3 | 7.94E-11 | 5.96E-11 | 4.98E-11 |  | 2.94E-11 | 3.61E-11 | $V_2$ |
| 3 | 50.2 | 3 | 8 | 7.7E-11 | 10.78E-11 | 4.83E-11 |  | 3.83E-11 | 3.52E-11 | $V_3$ |
| ⋮ |  |  |  |  |  |  |  |  |  | ⋮ |
| n | 50.9 | 7 | 7 | 7.14E-11 | 5.33E-11 | 4.47E-11 |  | 3.51E-11 | 3.21E-11 | $V_n$ |

1010a   1010b

APPARATUS AND METHOD ESTIMATING BREAKDOWN VOLTAGE OF SILICON DIOXIDE FILM USING NEURAL NETWORK MODEL

CROSS-REFERENCE TO RELATED APPLICATION

This application claims priority under 35 U.S.C. § 119 to Korean Patent Application No. 10-2021-0011032 filed on Jan. 26, 2021 in the Korean Intellectual Property Office, the subject matter of which is hereby incorporated by reference.

BACKGROUND

The inventive concept relates generally apparatuses and methods estimating a breakdown voltage of a silicon dioxide film. More particularly, the inventive concept relates to apparatuses and methods estimating a breakdown voltage of a silicon dioxide film using a neural network model.

Silicon dioxide films, like those commonly used in semiconductor devices, may be damaged or destroyed if exposed to a sufficiently high voltage. Defects caused by the destruction of the silicon dioxide film may occur during production of a semiconductor device, or during consumer operation of a product including the semiconductor device. It is therefore necessary, wherever possible, to detect such defects before failure of the product. Accordingly, performance in sections from initial defects to time-worn defects of the silicon dioxide film may be evaluated through acceleration stress before the product is shipped. However, acceleration stress evaluation must be performed during limited testing time and in relation to limited sample quantities in order to preserve acceptable levels of productivity.

SUMMARY

Embodiments of the inventive concept provide an estimation method capable of estimating a breakdown voltage of a silicon dioxide film based on a neural network model.

According to an aspect of the inventive concept, there is provided a method of estimating a breakdown voltage of a silicon dioxide film. The method includes; generating breakdown voltage information associated with first test dies selected from among test dies, generating a breakdown voltage estimation model by updating a parameter of a neural network model based on the breakdown voltage information, applying test voltages to second test die selected from among the test dies and distinct from the first dies and receiving currents levels for current generated by the second test dies in response to the test voltages, wherein the test voltages have respective levels lower than levels of breakdown voltages for the first test dies, and estimating breakdown voltages of the second test dies using the breakdown voltage estimation model in relation to the currents levels.

According to an aspect of the inventive concept, there is provided an apparatus for estimating a breakdown voltage of a silicon dioxide film. The apparatus includes; a training processor configured to generate a breakdown voltage estimation model by updating a parameter of a neural network model based on breakdown voltage information for first test dies selected from among test dies, and an inference processor configured to estimate breakdown voltages of second test dies, distinct from the first test dies, using the breakdown voltage estimation model and based on current levels measured in relation to test voltages applied to the second test dies, wherein the test voltages have lower levels than levels of breakdown voltages for the first test dies.

According to an aspect of the inventive concept, there is provided an operating method of a system estimating a breakdown voltage of a silicon dioxide film. The operating method includes; applying to a target test die, test voltages having a lower level than a predetermined breakdown voltage, reading current levels output from the target test die in relation to the test voltages, and estimating a breakdown voltage of the target test die by inputting the current levels into a breakdown voltage estimation model.

BRIEF DESCRIPTION OF THE DRAWINGS

The making and use of the inventive concept may be more clearly understood upon consideration of the following detailed description together with the accompanying drawings in which:

FIG. 10 is a table listing breakdown voltage information by filtering test data from among test data, according to an embodiment;

DETAILED DESCRIPTION

Throughout the written description and drawings, like reference numbers and labels are used to denote like or similar elements, components and/or features.

Figure 1:
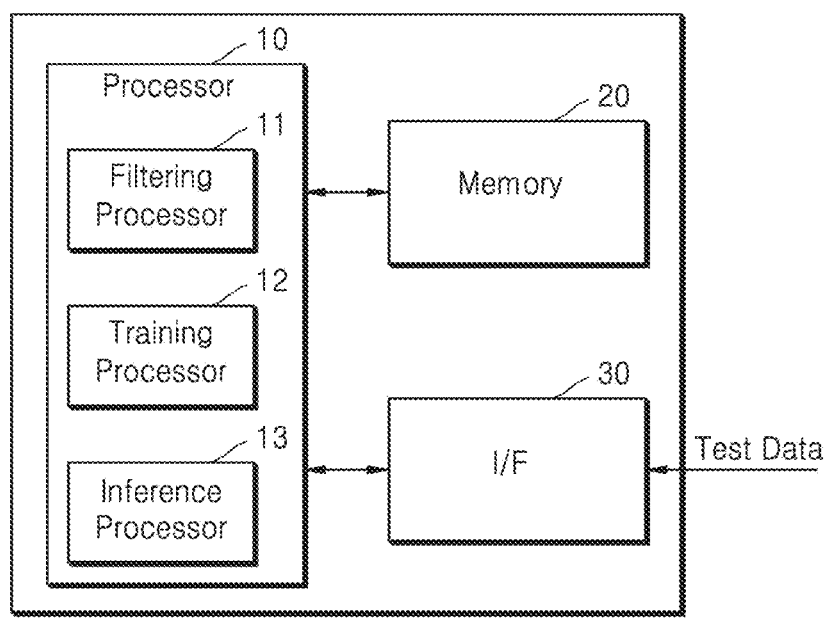
FIG. 1 is a block diagram illustrating an apparatus for estimating a breakdown voltage of a silicon dioxide film according to embodiments of the inventive concept.

Figure (FIG. 1 is a block diagram illustrating an apparatus 1 for estimating a breakdown voltage of a silicon dioxide film according to embodiments of the inventive concept.

Referring to FIG. 1, the apparatus 1 may generally include a processor 10, a memory 20, and an interface (I/F) 30. The processor 10 may include a filtering processor 11, a training processor 12, and an inference processor 13. Here, the processor 10 may be variously configured. For example, the processor 10 may be implemented using one or more hardware platforms (e.g., semiconductor chips) as well as related software to perform various operations.

The filtering processor 11 may generate breakdown voltage information for training based on test data. For example, the filtering processor 11 may generate breakdown voltage information by filtering certain test data deemed to be noise from among available test data using a defined standard (e.g., one or more reference(s)). The breakdown voltage information may be information including a breakdown voltage for each of a number of dies, and current levels at different test voltages. For example, when variance in the level of a particular current is greater than a threshold variance, the filtering processor 11 may determine that the variance is noise and exclude same from the breakdown voltage information.

The training processor 12 may generate a breakdown voltage estimation model by updating one or more parameter(s) (e.g., weighing parameters) for a neural network model based on the breakdown voltage information generated by the filtering processor 11. For example, the training processor 12 may update a parameter using a method of setting a breakdown voltage value measured in a first test die as output data to estimate a corresponding value. The breakdown voltage estimation model may be configured as a regression model estimating a breakdown voltage value, and may include (e.g.,) various types of machine learning models commonly used to estimate continuous data, such as a multiple regression model, a support vector regression (SVR) model, a deep learning model, or the like. However, the breakdown voltage estimation model is not limited to a particular type of neural network model, but may be configured as an ensemble model including multiple (e.g., combined) neural network models.

The inference processor 13 may derive (or "infer") a breakdown voltage of a second test die, different from the first test die, based on the breakdown voltage estimation model trained by the training processor 12. In some embodiments, the second test die may be a test die. The inference processor 13 may infer a breakdown voltage of the second test die based on current levels output to the second test die from a voltage level lower than a breakdown voltage level of the first test dies.

The memory 20 may store data received from the processor 10 and/or the interface 30, and may also output data in response to a request from the processor 10 and/or the interface 30. The memory 20 may store data received through the interface 30 and at least temporarily store the breakdown voltage information generated by the processor 10 and the breakdown voltage estimation model. The memory 20 may be include one or more of a dynamic random access memory (DRAM) such as synchronous (SDRAM), high bandwidth memory (HBM), or DRAM-based 3-dimensional stack (3DS) memory such as hybrid memory cube memory. Alternately or additionally, the memory 20 may include one or more of a solid state drive (SSD), a DRAM module, or a semiconductor-based storage such as static random access memory (SRAM), phase-change random access memory (PRAM), resistive random access memory (RRAM), conductive-bridging random access memory (CBRAM), magnetic random access memory (MRAM), spin-transfer torque MRAM (STT-MRAM).

The interface 30 may communicate (e.g., transmit and/or receive) data between the apparatus 1 and an external device. In this regard, the interface 30 may receive test data from an external testing device capable of reading a current level output in response to the application of a test voltage to a test die. Further in this regard, the interface 30 may output to an external device the breakdown voltage of the second test die estimated by the inference processor 13, Still further in this regard, the interface 30 may output wafer evaluation information once generated by the processor 10.

Figure 2:
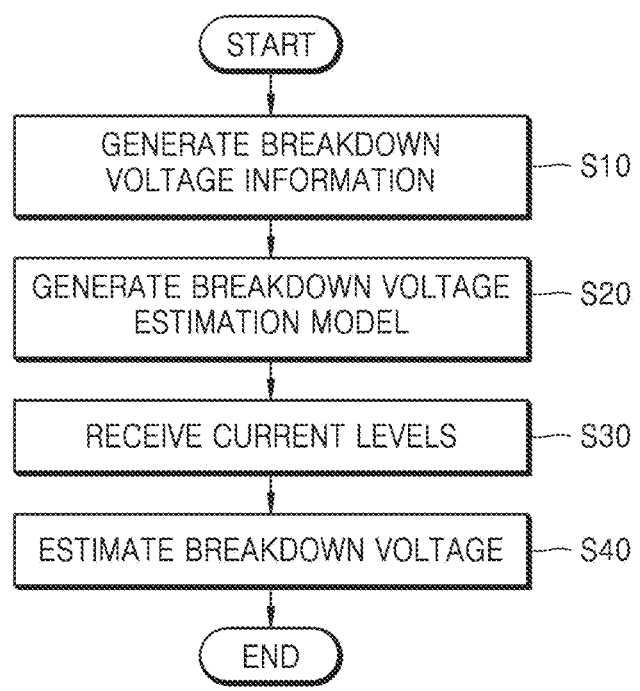
FIG. 2 is a flowchart illustrating a method of estimating a breakdown voltage according to embodiments of the inventive concept.

FIG. 2 is a flowchart illustrating a method of estimating a breakdown voltage according to embodiments of the inventive concept.

Referring to FIGS. 1 and 2, the processor 10 may generate a breakdown voltage estimation model by generating breakdown voltage information in relation to first test dies, and then estimating a breakdown voltage of second test dies based on the breakdown voltage estimation model.

For example, the processor 10 may generate the breakdown voltage information for the first test dies based on test data (S10). The first test dies may be selected from among a plurality of test dies in order to collect data for training the breakdown voltage estimation model. That is, the first test dies may be a test die group used to generate training data. In some embodiments, the processor 10 may generate the breakdown voltage information for the first test dies by filtering certain test data (hereafter, "filtered test data") from among test data. In this regard, embodiments of the inventive concept in which test data is filtered will be described hereafter in some additional detail with reference to FIGS. 6, 7, 8, 9, and 10.

Once the breakdown voltage information has been generated, the processor 10 may generate the breakdown voltage estimation model based on the breakdown voltage information (S20). The breakdown voltage estimation model may be a neural network model including multiple layers, and the breakdown voltage estimation model may be generated by updating weights respectively associated with the layers. In this regard, embodiments of the inventive concept in which the breakdown voltage estimation model is generated will be described hereafter in some additional detail with reference to FIG. 11.

Once the breakdown voltage estimation model has been generated, the apparatus 1 may receive current levels defined by applying test voltages to the second test dies, wherein the test voltages have level(s) lower than a breakdown voltage level (S30). The second test dies may be test dies distinct from the first test dies, and may in some embodiments, be estimation target test dies for estimating a breakdown voltage. That is, a voltage equal to the breakdown voltage should not be applied to the second test dies, and therefore, the apparatus 1 may estimate the breakdown voltage level of the second test dies. In this regard, a "breakdown voltage level" may be understood as a lowest level of a breakdown voltage simulated in a wafer operation or calculated based on specifications related to properties of the silicon dioxide film, and may be a voltage level calculated under an assumption of ideal operating conditions.

In response to the received current levels, the processor 10 may estimate a breakdown voltage using the breakdown voltage estimation model based (S40). Here, the breakdown voltage estimation model may be a trained model based on a current level associated with test voltage level(s) which is(are) less than the breakdown voltage level. In this manner, the processor 10 may estimate a breakdown voltage without directly measuring the breakdown voltage based on a relationship between variance in current level over a number of voltage sections and a breakdown voltage of a test die.

By way of comparison, other apparatuses routinely used to estimate a breakdown voltage gradually apply a voltage to each one of a number of test dies, and measure a resulting output current value. Using this approach, the applied voltage is gradually increased to a point at which the output current value increases rapidly. The voltage level causing this response is deemed to be the breakdown voltage. That is, because the comparative apparatuses must gradually apply an increasing voltage up to the level of the breakdown voltage, it may take a considerable period of time to measure the breakdown voltage. Further, using this approach, the silicon dioxide film of the test die is irreversibly destroyed.

In great contrast, the apparatuses and methods according to embodiments of the inventive concept need not apply gradually increased test voltage(s) to the level of the breakdown voltage, but instead may apply test voltage(s) having level(s) lower than the level of the breakdown voltage and measure current values generated in response to the test voltages. As a result, apparatuses and methods estimating a breakdown voltage according to embodiments of the inventive concept required markedly less time to obtain test data, as compared with the comparative examples. In addition, since apparatuses and method according to embodiments of the inventive concept do not necessarily apply test voltage(s) having level(s) equal to or greater than the level of the breakdown voltage, the silicon dioxide film of the test die will not be destroyed.

Figure 3:
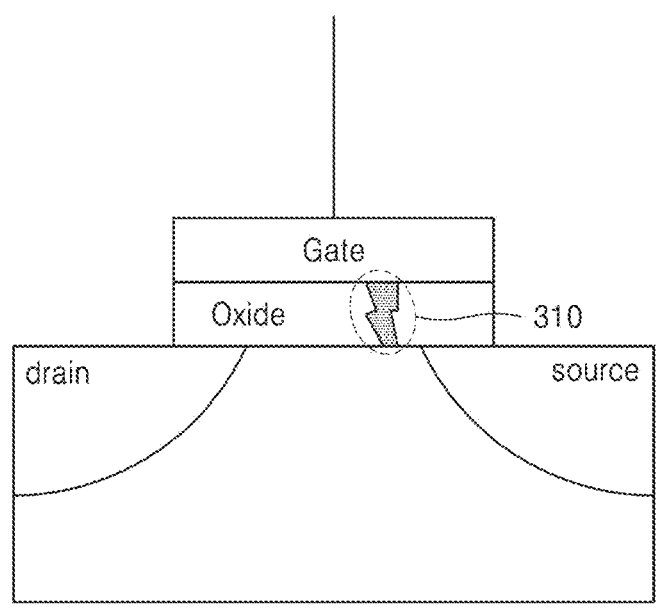
FIG. 3 is a conceptual diagram illustrating an example in which a silicon dioxide film is destroyed due to the application of an overvoltage test voltage to a test die.

FIG. 3 is a conceptual diagram illustrating an example in which a silicon dioxide film is destroyed due to the application of an overvoltage test voltage to a test die.

The destruction of the silicon dioxide film illustrated in FIG. 3 by an overvoltage test voltage is one type of defect that may be generated in a semiconductor device. However, a similar type of defect may arise when voltage(s) having level(s) lower than the breakdown voltage are applied to the silicon dioxide film over an extended period of time. As illustrated in FIG. 3, a defect caused by deterioration of the silicon dioxide film may be referred to as a time dependent dielectric breakdown (TDDB) defect. A failure 310 in the gate silicon dioxide film may be generated by a pinhole or similar property defect during the initial stages of testing and/or operation. However, less-then-destructive damage to the gate silicon dioxide film may arise due to weakening at a particular point in the silicon dioxide film or an anomaly in the materials forming the silicon dioxide film. Because the destruction 310 of a gate silicon dioxide film causes a large amount of leakage current, a metal-oxide-semiconductor field-effect transistor (MOSFET) including the destroyed gate silicon dioxide film will not operate properly and product defects may arise.

According to embodiments of the inventive concept, gradually increasing test voltage(s) having level(s) rising to the level of the breakdown voltage may be variously applied to the first test die, such that the apparatus 1 may identify a time at which destruction of the silicon dioxide film occurs in the first test die. In some embodiments, a wafer including the first test die may be graded (or evaluated) based on the this time and/or the level of the test voltage causing the destruction of the silicon dioxide film.

Figure 4:
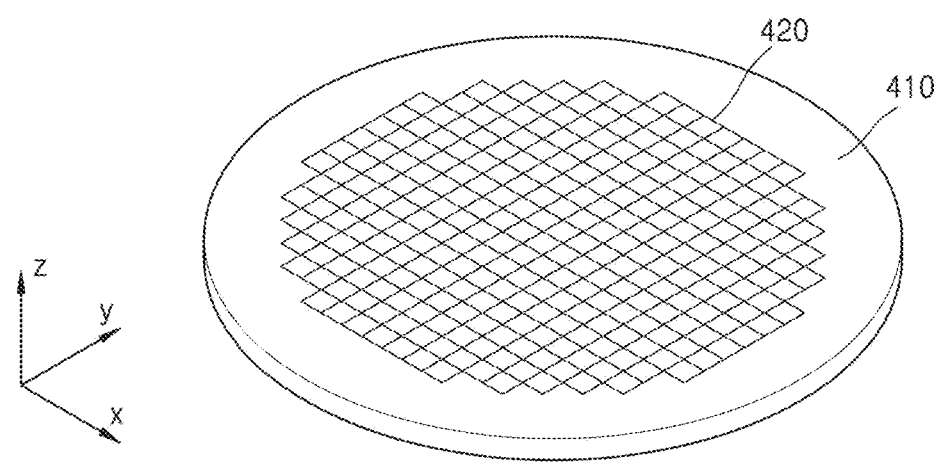
FIG. 4 is a conceptual diagram illustrating a wafer including a plurality of dies.

FIG. 4 is a conceptual diagram illustrating a wafer 410 including a plurality of dies.

Referring to FIG. 4, the wafer 410 may be one wafer selected from batch of wafers (e.g., a batch of wafers generated from an ingot), and including a plurality of dies 420 before being singulated. During subsequent wafer level testing, for example, a test chip may be mounted on one or more of the plurality of dies 420 included in the wafer 410 in order to collect various test data including breakdown voltage data in relation to a silicon dioxide film. Hence, a test target may be a chip mounted on a die, or may be a test element group (TEG) created only for testing purposed between dies.

In some embodiments, a breakdown voltage may be estimated for test dies on the wafer 410, and the processor 10 may obtain x/y coordinates for the wafer identifying the positions of test dies used to collect breakdown voltage information. In addition, the processor 10 may also collect a thickness value measured in the z-axis to identify the thickness of a silicon dioxide film for each test die or the TEG. In this regard, an embodiment in which the breakdown voltage estimation model is trained based on the collected die positions and the thickness of the silicon dioxide film will be described in some additional detail hereafter with reference to FIG. 10.

Figure 5:
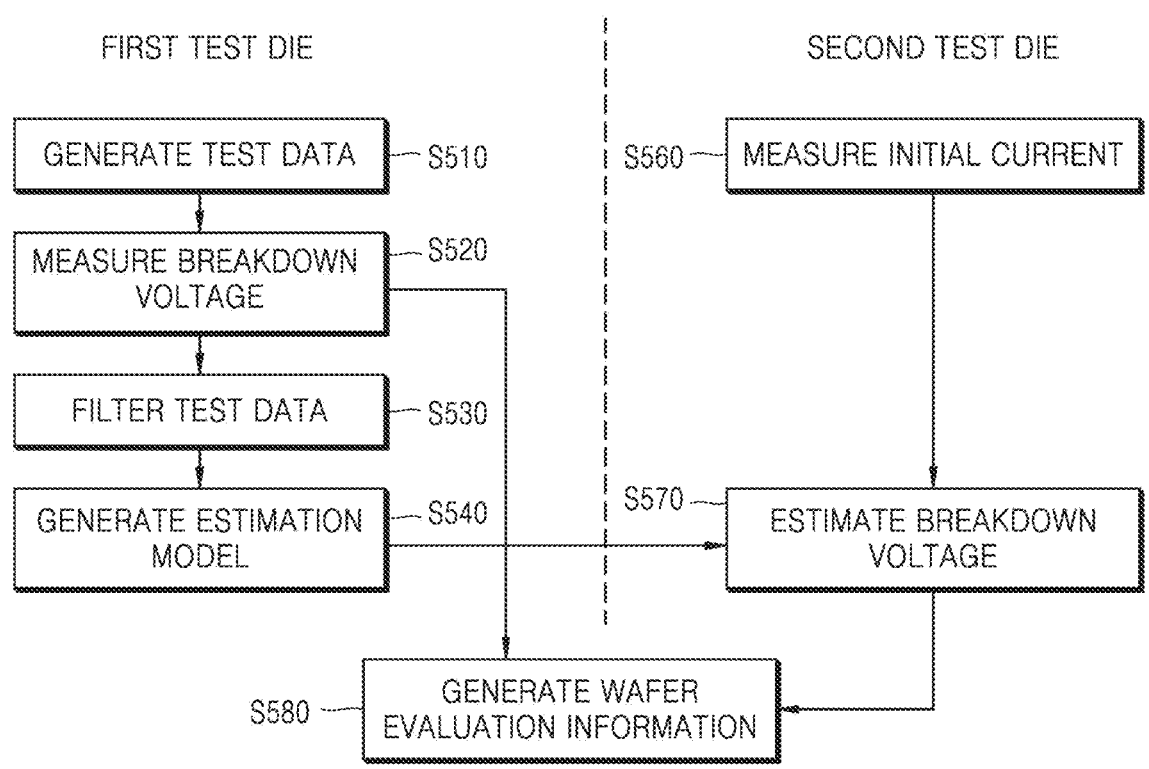
FIG. 5 is a flowchart illustrating an example in which a breakdown voltage is obtained from a first test die and a second test die among a plurality of dies according to embodiments of the inventive concept.

FIG. 5 is a flowchart illustrating an example in which a breakdown voltage is obtained from a first test die and a second test die selected from among a plurality of test dies according to embodiments of the inventive concept.

Referring to FIG. 5, a plurality of test dies may include the first test die and the second test die. The first test die may be a test die in which a breakdown voltage is directly measured by applying a gradually increasing voltage to measure the breakdown voltage until the silicon dioxide film is destroyed, thereby losing the first test die. In this regard, during the breakdown voltage testing of the first test die, the processor 10 may collect test data and appropriately filter the collected test data to generate the breakdown voltage estimation model.

Thereafter, when the breakdown voltage for the second test die (or all subsequent test dies) is measured, direct application of destructive test voltage(s) need not be occur. Rather, the breakdown voltage may be estimated based on a trained breakdown voltage estimation model using the test results obtained from the first test die. That is, the processor 10 may estimate a breakdown voltage of the second test die based on current(s) measured in relation to a number of test voltage levels applied to the second test die, albeit test voltage(s) having level(s) below the breakdown voltage.

Referring to FIG. 5, in some embodiments, test results for a first test die may be derived by: generating test data (S510); measuring a breakdown voltage using the generated test data (S520); filtering the test data (S530); and generating a breakdown voltage estimation model. Of note, the measured breakdown voltage derived by direct testing of the first test die may subsequently be used to generate wafer evaluation information (S580). Test results for a second test die may be derived by: measuring initial current(s) (S560) in response to applied test voltage(s); and estimating a breakdown voltage based on the measured initial currents in view of the generated estimation model (S570). Collectively, the estimated breakdown voltage for the second test die and the measured breakdown voltage for the first test die may be used to generate the wafer evaluation information (S580).

In some embodiments, a ratio of the second test die to the first test die among the plurality of test dies may be determined based on the consistency of test data generated by the first test die. When test data is determined to be highly consistent, the processor 10 may reduce the number of first test dies in which the breakdown voltage thereof is directly measured, and increase the number of second test dies in which the breakdown thereof voltage is estimated. Accordingly, the processor 10 may obtain the breakdown voltage using the same overall number of test dies, albeit over a greatly reduced testing time.

In some embodiments, the processor 10 may obtain the consistency value of a particular test data model as a determination factor (r-squared), and may determine a ratio of the second test die to the first test die based on the consistency value. For example, when the determination factor is less than 0.4, the processor 10 may increase the number of first test dies, and when the determination factor is greater than or equal to 0.6, the processor 10 may increase the number of second test dies.

A breakdown voltage estimation apparatus according to embodiments of the inventive concept may output wafer evaluation information by evaluating the grade of a wafer including various test dies based on breakdown voltage(s) measured from first test die(s) and breakdown voltage(s) estimated from second test die(s). In general, the higher the breakdown voltage, the lower the possibility that a semiconductor device produced from a corresponding wafer will fail, and a wafer grade indicating an operation result for a wafer may be determined based on the breakdown voltage. For example, a wafer including a test die, in which a collected breakdown voltage thereof is equal to or less than a first reference value, may be evaluated as a C-grade wafer, whereas a wafer including a test die, in which a breakdown voltage thereof is greater than the first reference value and equal to or less than a second reference value, which is greater than the first reference value, may be evaluated as a B-grade wafer. And a wafer including a test die, in which a breakdown voltage thereof is greater than the second reference value, may be evaluated as an A-grade wafer.

Figure 6:
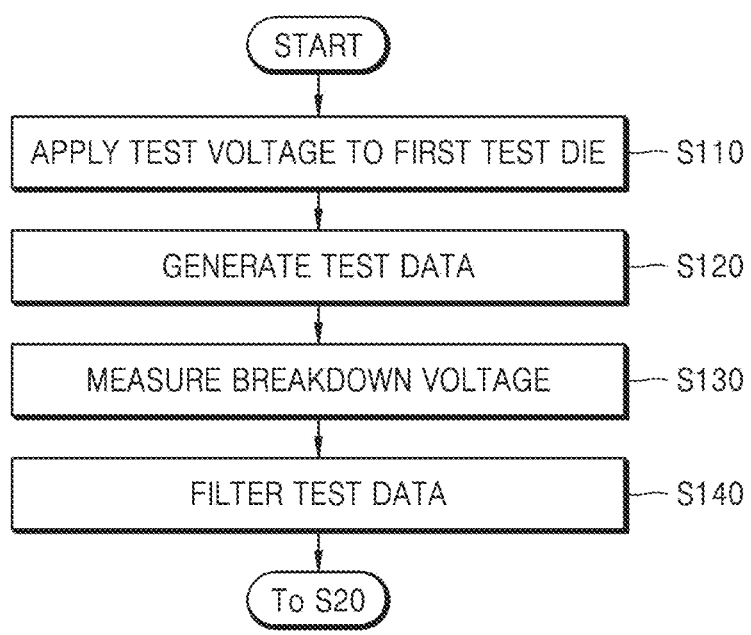
FIG. 6 is a flowchart illustrating an example in which breakdown voltage information is obtained by filtering test data according to embodiments of the inventive concept.

FIG. 6 is a flowchart illustrating an example in which breakdown voltage information is obtained by filtering test data according to embodiments of the inventive concept.

Referring to FIGS. 1 and 6, the processor 10 may collect test data and filter the collected test data to generate breakdown voltage information. The processor 10 may filter-out certain data ("filtered data") deemed to be noise from among the test data in order to prevent the generation of inaccurate model(s) based on test data including noise during the training of a breakdown voltage estimation model.

Figure 14:
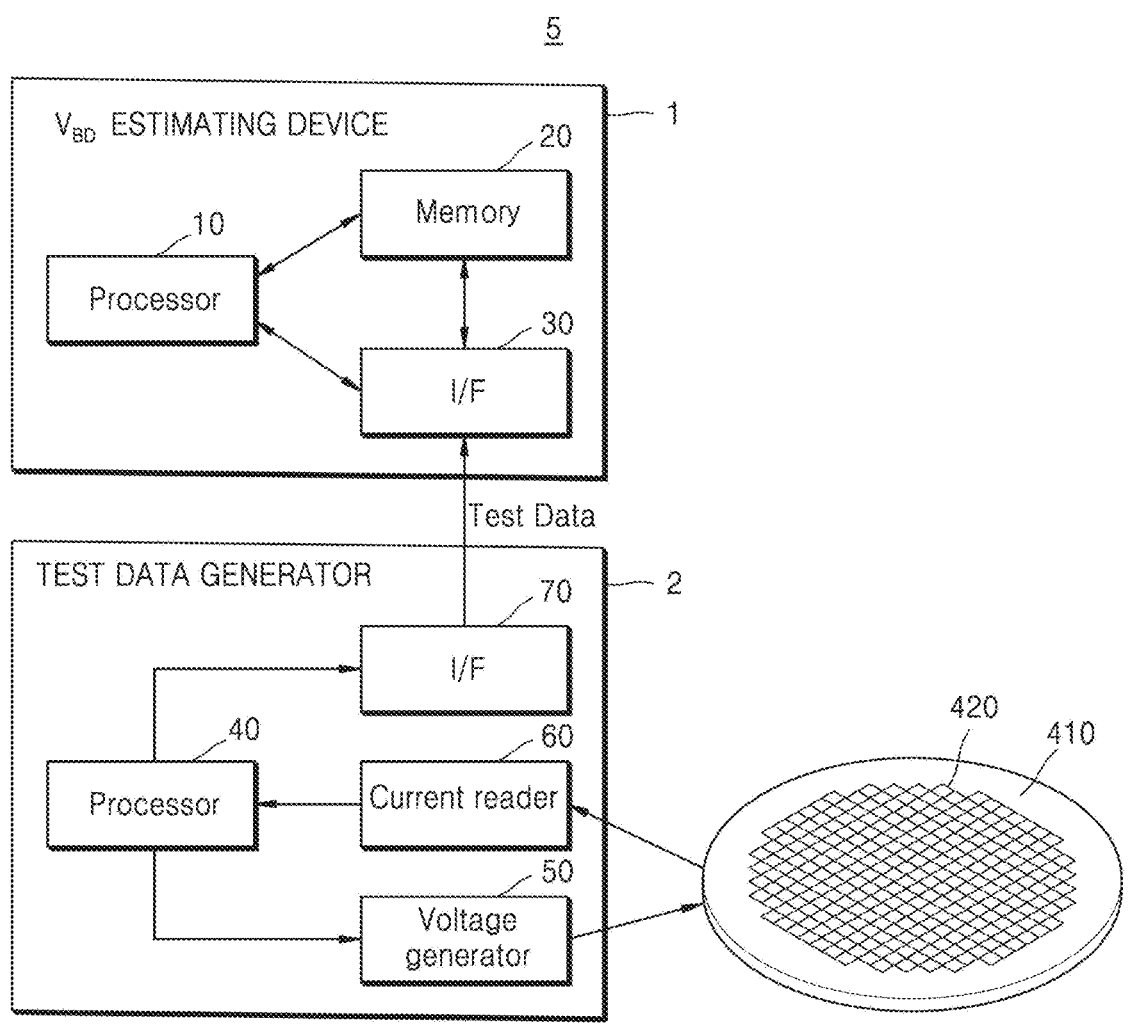
FIG. 14 is a block diagram illustrating a system for estimating a breakdown voltage of a silicon dioxide film, according to an embodiment of the inventive concept.

For example, a "test data generator" of the type described in relation to FIG. 14 hereafter may be used to apply test voltage(s) to first test dies selected from among a plurality of test dies (S110). The test voltages may include voltages having different levels lower than the level of a preset breakdown voltage. In this regard, the interval of application between the test voltages may be constant, but embodiments of the inventive concept are not limited thereto. The test data generator may calculate the interval between each of the test voltages. The breakdown voltage level may be a lowest value of a breakdown voltage which is simulated in a wafer operation and/or calculated based on specifications of properties of a silicon dioxide film, and may be a voltage level calculated under ideal assumptions.

The test data generator may generate test data by reading current levels generated in response to the applied test voltages (S120). In this regard, the test data generator may generate a table by mapping respective current levels with corresponding test voltages.

The test data generator may measure actual breakdown voltages for one or more first test dies (S130). When a voltage, which is less than a breakdown voltage, is applied to each of the first test dies, because a gate silicon dioxide film of the first test die is not destroyed, a current level output from the first test die may be a small value. When the test data generator applies a voltage, which is equal to or greater than a breakdown voltage, by gradually increasing the voltage applied to the first test die, the silicon dioxide film may be destroyed. When the silicon dioxide film is destroyed, large current leaking through the destroyed silicon dioxide film is generated, and a current level output from the first test die may rapidly increase due to the leakage current. The test data generator may determine a voltage level, at which a current level has increased sharply, to be a breakdown voltage.

The test data generator or breakdown voltage estimation apparatus may then collect a breakdown voltage and test data (including test voltage(s) and corresponding current level(s)), and may generate breakdown voltage information by filtering the test data (S140). The filtering of the test data may be referred as a pre-treatment for generating training data. Hereinafter, an embodiment in which test data is filtered will be described in some additional detail with reference to FIGS. 8, 9 and 10.

Figure 7:
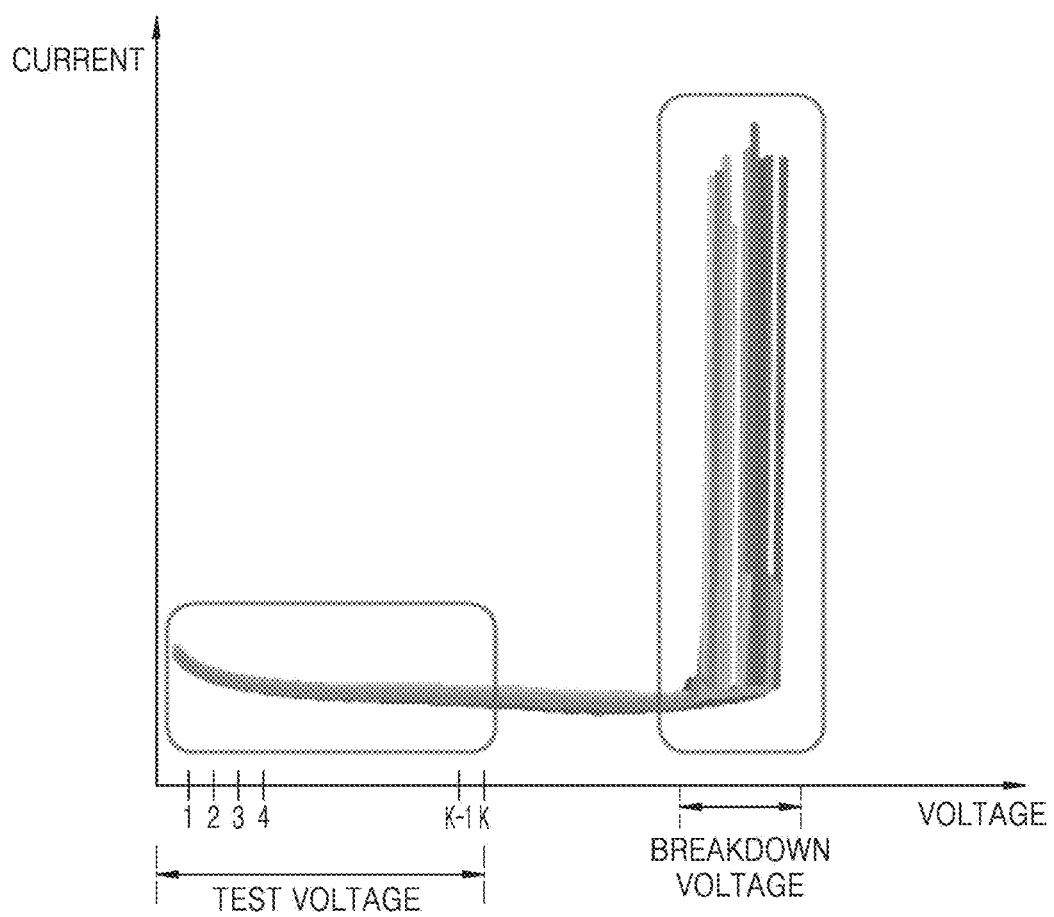
FIG. 7 is a graph illustrating current levels output in relation to test voltages and breakdown voltages applied to a first test die.

FIG. 7 is a graph illustrating current levels output in response to test voltages, as well as breakdown voltages applied to a first test die.

Referring to FIGS. 1 and 7, a test data generator may apply a plurality of test voltages to a first test die and obtain current levels output from the first test die in response to the application of the test voltages. That is, the test data generator may apply the test voltages to the first test die to collect test data. For example, the test data generator may apply the test voltages to the first test die according to a constant voltage interval. When the test data generator applies test voltages to the first test dies, the test data generator may measure current levels corresponding to each of the test voltages from each of the first test dies.

For example, referring to FIG. 7, test voltages may include k voltage levels (wherein 'k' is a natural number), and assuming that the number of first test dies is 10, the test data generator may apply k test voltages to 10 first test dies. Accordingly, the test data generator may measure (10*k) current levels and generate test data by mapping a current level to each of the first test dies and each of the test voltages.

The test data generator may measure a breakdown voltage in parallel with the generation of the test data in some embodiments, and may measure a breakdown voltage at which a silicon dioxide film is destroyed by gradually increasing a voltage applied to one of the first test dies. In the embodiment of FIG. 7, the first test die on which a breakdown voltage is directly measured may be one of the selected test dies for each wafer being evaluated. In this regard, each of the test dies may have a different wafer thickness, and may have different operation results according to a die position on a wafer. Accordingly, each of the first test dies may be test dies having different breakdown voltages.

Figure 8:
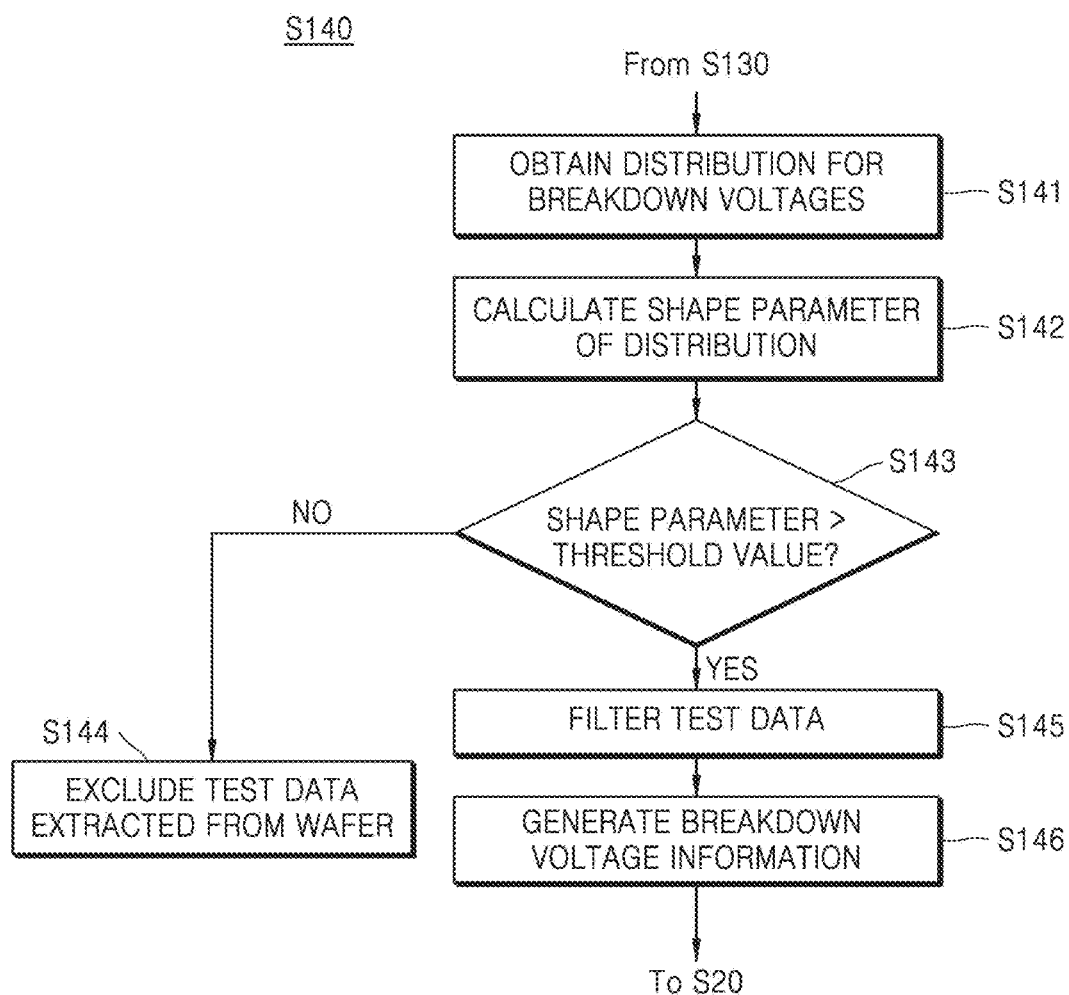
FIG. 8 is a flowchart illustrating an example in which test data is filtered according to embodiments of the inventive concept.

FIG. 8 is a flowchart illustrating an example in which test data is filtered according to embodiments of the inventive concept.

Referring to FIGS. 1 and 8, the processor 10—having already received test data—may generate breakdown voltage information based on a breakdown voltage distribution for first test dies included in an arbitrary wafer, and determine whether to exclude test data extracted from a corresponding wafer. In addition, the processor 10 may generate the breakdown voltage information by selectively filtering test data. In some embodiments, the processor 10 may determine whether a shape parameter of a breakdown voltage obtained from a plurality of test dies is greater than a threshold value, and when the shape parameter is greater than the threshold value, the processor 10 may filter the test data by removing noise of test data associated with the plurality of test dies.

For example, the processor 10 may obtain a breakdown voltage distribution (e.g., a Weibull distributions) for the first test dies included in an arbitrary wafer (S141). The processor 10 may obtain the breakdown voltage distribution by aligning levels of breakdown voltages obtained from the first test dies.

The processor 10 may calculate a shape parameter of the breakdown voltage distribution (S142). Assuming that the breakdown voltage distribution is a Weibull distribution in a working example, the shape parameter of the breakdown voltage distribution may be a parameter indicating an operation distribution. The shape parameter may have a greater value as data spreads less, and may have a smaller value as data spreads more. That is, as the distribution of breakdown voltages obtained from the first test dies increases, the shape parameter may decrease.

The processor 10 may compare the shape parameter obtained from the test data to a threshold value (S143). When the obtained shape parameter is less than or equal to the threshold value (S143=NO), it may indicate that the breakdown voltage distribution associated with the first test dies is broad beyond a level defined by a threshold level. That is, it may indicate that one or more silicon dioxide film(s) has deteriorated due to relatively low voltage(s), such the test data includes incidents of silicon dioxide film deterioration due to both high voltages and low voltages. Accordingly, a shape parameter less than or equal to the threshold value indicates a situation in which one or more of the failing test dies present in the sample is not the result of a breakdown voltage application. Hence, this particular first test die result should be filtered from the test data. One example of a test die experiencing a non-relevant defect (e.g., a defect occurring in relation to a relatively low voltage applied over time) will be described in some additional detail hereafter with reference to FIG. 9

However, when the processor 10 determines that a test die having a high possibility in which the initial defect has occurred among the first test dies included in an arbitrary wafer is greater than or equal to the threshold numerical value based on the result of comparing the shape parameter with the threshold value (S143=YES), the processor 10 may filter (e.g., exclude) test data generated from the corresponding wafer in order to generate the breakdown voltage information (S145).

Here, when the processor 10 determines that the initial defects have not occurred in a level greater than or equal to the threshold numerical value because the shape parameter is greater than the threshold value (S143=YES), the processor 10 may filter-out certain test data associated with a first test die experiencing a non-relevant defect (a "target test die") among the selected first test dies. That is, the test data obtained from the target test die may include (or be deemed to be) noise. In some embodiments, the processor 10 may filter noise based on a current level difference between adjacent voltage levels. One embodiment in which the processor 10 filters noise will be described in some additional detail hereafter with reference to FIG. 10.

The processor 10 may generate the breakdown voltage information by removing noise from the target test die (S146). When there are multiple test dies generating breakdown voltage information, the processor 10 may generate the breakdown voltage information by removing noise for each of the test dies. The processor 10 may train the breakdown voltage estimation model based on the generated breakdown voltage information.

Figure 9:
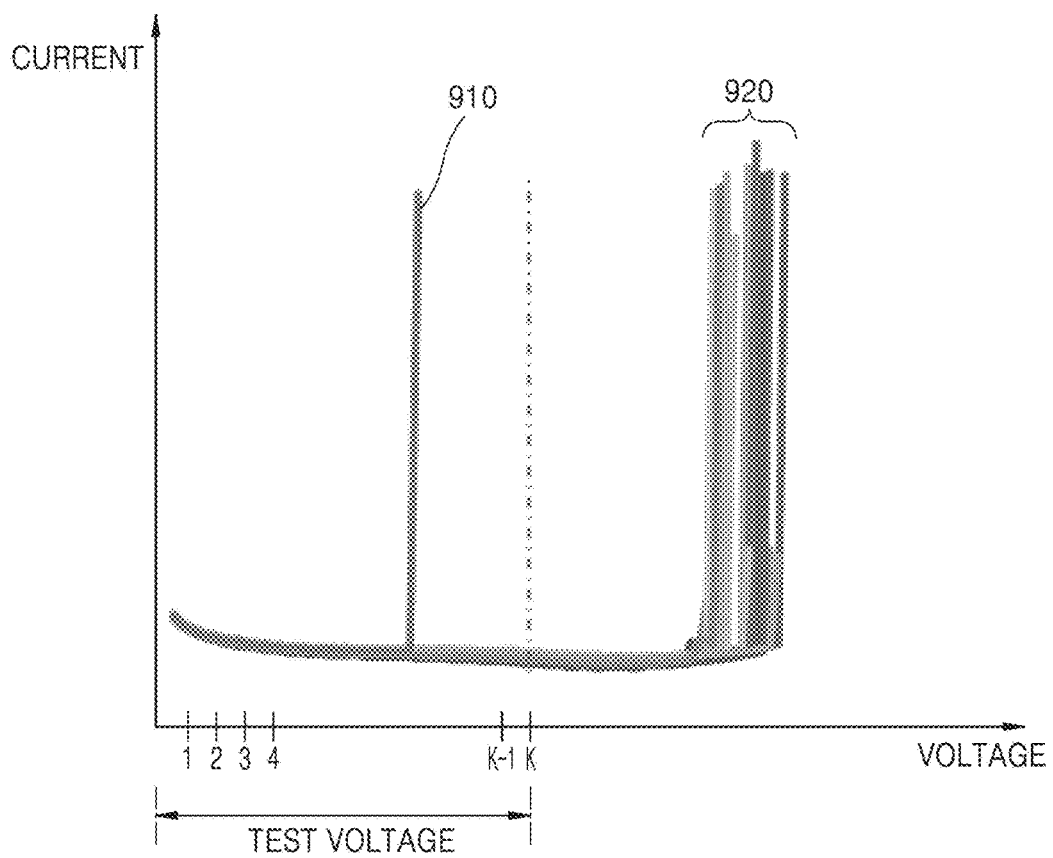
FIG. 9 is a graph illustrating an example in which some first test dies among selected first test dies are filtered according to embodiments of the inventive concept.

FIG. 9 is a graph illustrating an example in which at least one first test dies among selected first test dies are filtered according to embodiments of the inventive concept.

Referring to FIG. 9, when the test data generator obtains test data from the selected first test dies, an "initial defect" 910 in which a silicon dioxide film is destroyed may occur during the application of test voltages. For example, the silicon dioxide film defect may associated with a wear defect 920 or the initial defect 910, wherein the wear defect 920 is a defect characterized by a frequency of occurrence that increases over time with performing of product operations or a usage period. Hence, the wear defect 920 may be a defect related to life span of the corresponding wafer. In contrast, the initial defect 910 may be a defect that occurs due to a problem in an operation, and may be a defect that occurs even when a relatively low voltage is applied over a short period of operating time. That is, the wear defect 920 is a defect that naturally occurs in relation to usage time of a product, and the initial defect 910 is a defect observed relatively early in the operation of the product, regardless of the actual life span of the product. Accordingly, it is important to filter-out test data associated with the initial defect 910 in order to faithfully evaluate a grade of a wafer associated with the life span of the product.

Referring to FIG. 9, a test die in which a silicon dioxide film is destroyed while the test data generation apparatus applies a test voltage to the selected first test dies included in an arbitrary wafer may exist. That is, a test die in which a breakdown voltage thereof is measured while a test voltage is applied may exist, and the processor 10 may determine the same to be a test die having the characteristics of the initial defect 910.

In some embodiments, when the processor 10 determines that a test die in which the initial defect 910 has occurred in a corresponding wafer exists in a level greater than or equal to a threshold numerical value based on a Weibull distribution of the breakdown voltage, the processor 10 may filter-out (or exclude) test data obtained from the corresponding wafer when generating the breakdown voltage estimation model. Accordingly, the processor 10 may increase the accuracy of the breakdown voltage estimation model for estimating a breakdown voltage by filtering a wafer which is determined to have a high probability of occurrence of the initial defect 910.

FIG. 10 is a table listing breakdown voltage information associated with filtering of certain test data from among the generated test data according to embodiments of the inventive concept.

Referring to FIG. 10, the processor 10 may obtain breakdown voltage information by filtering test data obtained from the selected first test dies. The breakdown voltage information may include a pair of input data and output data for updating the weight of the breakdown voltage estimation model, and each of first test dies may be divided into one index and stored.

The input data of the breakdown voltage information may include a die position and a gate silicon dioxide film thickness of each test die. Referring to FIG. 4, the die position may be specified by an x/y coordinate values on a wafer, and the wafer thickness may be specified by a z-coordinate value of the wafer. The characteristics in a manufacturing operation may be different according to the die position, and the thickness of a gate silicon dioxide film may be a factor that affects a time point of the occurrence of defect and the breakdown voltage. In addition, the input data of the breakdown voltage information may include current levels corresponding to a plurality of test voltages. The processor 10 may designate a breakdown voltage of each of first test dies among test data as the output data of the breakdown voltage information.

In some embodiments, the processor 10 may filter-out certain test data from the generated test data based on a current level difference between adjacent voltage levels. For example, when the current level difference between the adjacent voltage levels is greater than or equal to a threshold variance, which is a standard that a silicon dioxide film is deteriorated, the processor 10 may determine the test data to be noise and exclude same from the test data.

Referring to FIG. 10, from among test data obtained from a test die corresponding to a second index, a current level 1010b for a k−1th test voltage may be $12.94*10^{-11}$ A, and a current level for a kth test voltage may be $3.61*10^{-11}$ A. A variance in current level between the k−1th current level and the kth current level may be $9.33*10^{-11}$ A, and when the variance in current level is greater than a threshold variance amount according to a result of comparison with the threshold variance amount, the processor 10 may remove test data corresponding to the kth current level of the test die corresponding to a third index from the test data by determining the same to be date after deterioration of the gate silicon dioxide film. In like manner, from among test data obtained from a test die corresponding to a third index, a current level 1010a for a second test voltage may be $10.78*10^{-11}$ A, a current level for a first test voltage may be $7.7*10^{-11}$ A, and a current level for a third test voltage may be $4.83*10^{-11}$ A. A variance in current level between the second current level and the first current level may be $3.08*10^{-11}$ A, and a variance in current level between the second current level and the third current level may be $5.95*10^{-11}$ A. When the variance in current level is greater than a threshold variance amount according to a result of comparison with the threshold variance amount, the processor 10 may remove test data corresponding to the second current level of the test die corresponding to a third index by determining the same to be date after deterioration of the gate silicon dioxide film.

In some embodiments, the processor 10 may calculate a variance in current level between all adjacent voltage levels, and may remove a certain ratio of test data from the test data in an order of large current level variations. Referring to FIG. 10, when the number of indices is 10 (wherein n is a natural number) and the number of test voltages is k, the processor 10 may calculate a variance of n*(k−1) current levels based on a current level difference between adjacent voltage levels. The processor 10 may specify a variance in current level of a certain ratio in an order of a large value among the variance of n*(k−1) current levels, and may generate breakdown voltage information by removing test data corresponding to the specified variance in current level of a certain ratio.

Figure 11:
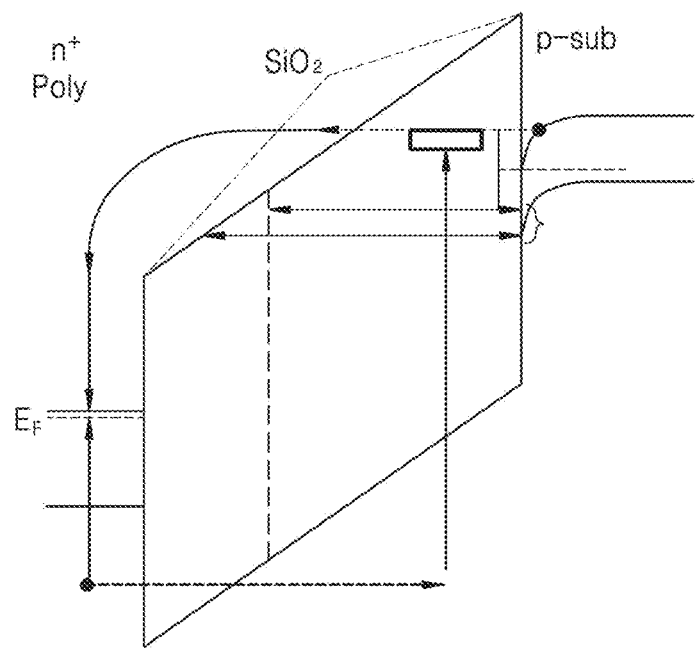
FIG. 11 is a graph illustrating an energy band in which an energy barrier is inclined by forming an electric field in a gate silicon dioxide film.

FIG. 11 is a conceptual diagram illustrating an energy band in which an energy barrier is inclined by forming an electric field in a gate silicon dioxide film.

When no voltage is applied to a silicon dioxide film, an energy band of a metal-oxide-semiconductor (MOS) junction has a rectangular shape, but when an electric field is formed, an energy band may be inclined as shown in FIG. 11, and the inclination may increase as the electric field is stronger. Although electrons require energy which is greater than or equal to a work function to pass through an insulating film, the electrons may electrically pass through an electrically thinned insulating film even when energy, which is less than or equal to the work function, is applied, thereby generating a leakage current. A phenomenon in which a leakage current occurs in energy which is less than or equal to a work function may be referred to a Fowler-Nordheim (FN) tunneling phenomenon. A current according to the FN tunneling may be described by Equation 1 below, wherein $E_{ox}$ is a silicon dioxide film field value of a tunneling surface, and 'A' and 'B' are coefficients expressed by a combination of several constants representing physical properties.

$$J = AE_{ox}^2 \exp\left(-\frac{B}{E_{ox}}\right) \qquad \text{[Equation 1]}$$

After a leakage current is generated by the FN tunneling, when traps accumulate on the silicon dioxide film, the barrier height thereof may increase and the current thereof may decrease. When the traps accumulate greater than or equal to a certain amount, the leakage current may increase again as electrons pass through the traps. A phenomenon in which a leakage current is generated over a trap may be referred to as a trap assisted (TA) tunneling phenomenon. A current according to the TA tunneling phenomenon may be described by Equation 2 below, wherein h is Planck's constant, 'm' is an electron effective mass, and $\phi_t$ is energy of a trapped electron.

$$J_{TAT} = A_{TAT} \exp\left(\frac{-8\pi\sqrt{2qm}}{3hE}\phi_t^{3/2}\right) \qquad \text{[Equation 2]}$$

A current level output as a test voltage is applied to a gate silicon dioxide film may be increased or decreased according to the FN tunneling phenomenon, the TA tunneling phenomenon, and a hole trapping phenomenon. The processor according to an embodiment may calculate a slope in at least one voltage section based on a variance in current level, and generate the slope as input data of breakdown voltage information by using the slope as a coefficient of at least one fitting model.

Figure 12:
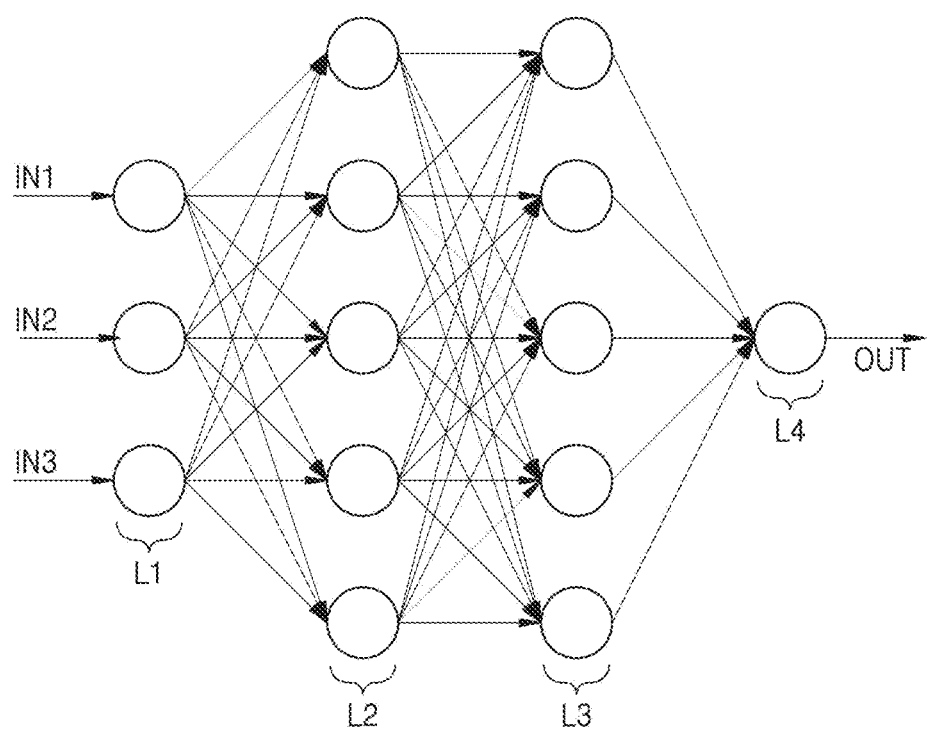
FIG. 12 is a diagram of a breakdown voltage estimation model in which parameters thereof are updated based on a breakdown voltage.

FIG. 12 is a conceptual diagram illustrating a breakdown voltage estimation model in which related parameters may be updated based on a breakdown voltage.

The breakdown voltage estimation model of FIG. 12 assumes a plurality of layers (e.g., first to fourth layers L1, L2, L3, and L4), and the processor 10 of FIG. 1 may output result data of each layer and receive result data from a previous layer to generate interference data OUT in a final layer.

Referring to FIGS. 1 and 12, the breakdown voltage estimation model including four layers (e.g., first to fourth layers L1, L2, L3, and L4) assumes that the first layer L1 is an input layer, the second layer L2 and the third layer L3 are hidden layers, and the fourth layer L4 is an output layer. The memory 20 may be used to store data related to the trained breakdown voltage estimation model as model data, and may store weight parameters, which are updated by training for each layer, as layer data. That is, the model data may include layer data and structure data associated with the layers configuring in the exemplary model.

Figure 13:
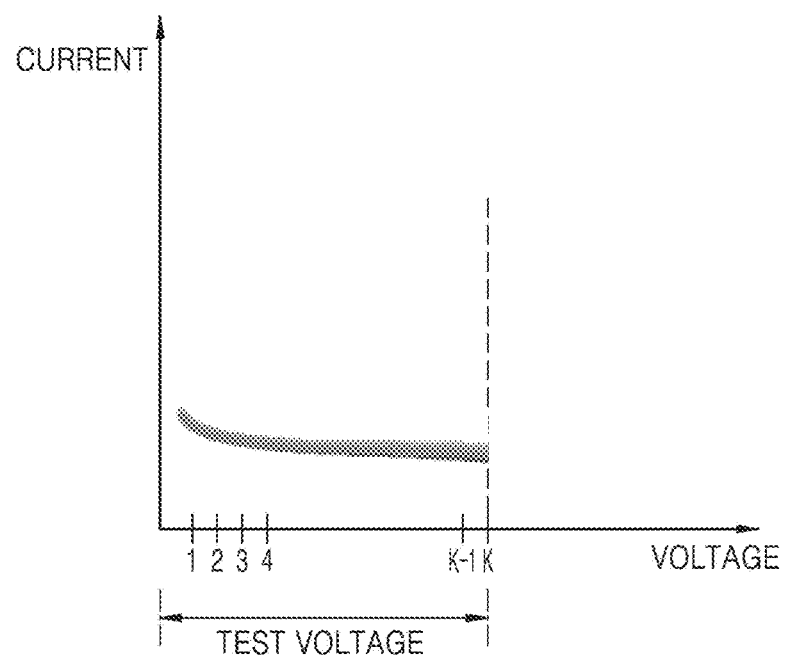
FIG. 13 is a graph illustrating an example in which current levels at a plurality of test voltages are measured, according to an embodiment of the inventive concept.

FIG. 13 is a graph illustrating an example in which current levels associated with test voltages are measured according to embodiments of the inventive concept.

Referring to FIGS. 1 and 13, the test data generator may measure current levels by applying test voltages to the selected second test dies. In some embodiments, the test voltages applied to the second test dies may correspond to test voltages applied to first test dies. However, the test data generator will not apply a test voltage having a level of the breakdown voltage to the second test dies. Thus, in the illustrated example of FIG. 13, only up to a kth test voltage is applied.

In this regard, the processor 10 may receive test data associated with the second test dies from the test data generator, and input the test data to the breakdown voltage estimation model to estimate a breakdown voltage for each of the second test dies. When testing is performed by applying, to the second test dies, a voltage only up to P % (wherein P is real number) voltage level as compared to the first test dies, the test time of each of the second test dies may be reduced by (100−P) % compared to the first test dies, and testable number of test dies per hour may be increased by (100/P*100−100) %. In this case, when L % (wherein L is a real number) of a plurality of test dies is the first test dies, and (1−L) % of the plurality of test dies is the second test dies, the testable number of test dies per hour may be increased by $$\frac{1}{\frac{L}{100}+\frac{1-L}{100}*\frac{P}{100}}*100-100.$$

FIG. 14 is a block diagram illustrating a system 5 for estimating a breakdown voltage of a silicon dioxide film according to embodiments of the inventive concept.

Referring to FIGS. 1 and 14, the system 5 may include a breakdown voltage estimating device 1 and a test data generator 2. The breakdown voltage estimating device 1 may include the processor 10, the memory 20, and the interface 30, and may receive test data from the test data generator 2 through the interface 30. The processor 10 of the breakdown voltage estimating device 1 may generate breakdown voltage information by filtering the received test data and train a neural network model based on the breakdown voltage information. The processor 10 of the breakdown voltage estimating device 1 may generate a breakdown voltage estimation model and then receive test data generated by second test dies from the test data generator device 2 to estimate a breakdown voltage for each of the second test dies. It has been described above that the processor 10 of the breakdown voltage estimating device 1 trains the breakdown voltage estimation model based on first test dies and estimates breakdown voltages of the second test dies based on the breakdown voltage estimation model, and thus, a detailed description thereof will be omitted.

The test data generator device 2 may include a processor 40, a voltage generator 50, a current reader 60, and an interface 70, and may transmit test data to the breakdown voltage estimating device 1 through the interface 70. The processor 40 of the data generating device 2 may provide a command for applying a plurality of test voltages to the first test dies to the voltage generator 50, and the voltage generator 50 may apply the plurality of test voltages to the first test dies. The current reader 60 may read currents based on the plurality of test voltages from the first test dies, and the processor 40 may generate test data by mapping the read currents and the plurality of test voltages. In addition, the processor 40 may apply a voltage by gradually increasing the voltage to the first test dies, and determine a voltage at which the read current rapidly increases to be a breakdown voltage.

The test data generator device 2 may measure current levels corresponding to the plurality of test voltages even for the second test dies, which are distinguished from the first test dies. Unlike the first test dies, the test data generating device 2 may not measure a breakdown voltage of the second test dies, but may only measure current levels corresponding to the plurality of test voltages. The test data generator device 2 may provide test data for the second test dies to the breakdown voltage estimating device 1.

While the inventive concept has been particularly shown and described with reference to embodiments thereof, it will be understood that various changes in form and details may be made therein without departing from the spirit and scope of the following claims.

What is claimed is:

1. A method of estimating a breakdown voltage of a silicon dioxide film, the method comprising:
applying a plurality of different first test voltages to each of first test dies selected from among test dies, and detecting respective current levels generated by each of the first test dies in response to the plurality of different first test voltages;
generating breakdown voltage information associated with the first test dies based on the current levels associated with the plurality of different first test voltages;
generating a breakdown voltage estimation model by updating a parameter of a neural network model based on the breakdown voltage information;
applying a plurality of different second test voltages to each of second test dies selected from among the test dies and distinct from the first test dies, and detecting respective current levels generated by each of the second test dies in response to the plurality of different second test voltages, wherein the plurality of different second test voltages are selected from among the plurality of different first test voltages, and have levels lower than levels of breakdown voltages for the respective first test dies; and
estimating breakdown voltages of the second test dies without destroying respective silicon dioxide films of the second test dies by applying the current levels associated with different second test voltages to the breakdown voltage estimation model.

2. The method of claim 1, wherein the breakdown voltage information includes a breakdown voltage of each of the first test dies and the current levels associated with the plurality of different first test voltages.

3. The method of claim 1, wherein the generating of the breakdown voltage information comprises:
generating test data based on the current levels associated with the plurality of different first test voltages; and
measuring the breakdown voltages for the respective first test dies by identifying voltages at which silicon dioxide films of the first test dies are destroyed.

4. The method of claim 3, wherein the generating of the breakdown voltage information further comprises:
generating the breakdown voltage information by filtering test data based on variances in the current levels associated with the plurality of different first test voltages.

5. The method of claim 4, wherein at least one of the variances in the current levels associated with the plurality of different first test voltages is less than a threshold variance.

6. The method of claim 4, wherein the generating of the breakdown voltage information further comprises:
generating the breakdown voltage information based on a ratio of the test data according to the variances in the current levels associated with the plurality of different first test voltages exceeding a threshold variance.

7. The method of claim 3, wherein the generating of the breakdown voltage information further comprises:
generating the breakdown voltage information by filtering certain test data from the test data based on a shape parameter of a distribution for the breakdown voltages for the first test dies.

8. The method of claim 1, wherein the generating of the breakdown voltage estimation model comprises:
storing a silicon dioxide film thickness and die position for each of the first test dies as input data of a training data set, and
storing a breakdown voltage of each of the first test dies as output data of the training data set to generate the training data set.

9. The method of claim 1, wherein the generating of the breakdown voltage estimation model comprises:
calculating a current variance slope for variances in a test voltage based on the breakdown voltage information; and
storing the current variance slope as input data of a training data set and storing a breakdown voltage of each of the first test dies as output data of the training data set to generate the training data set.

10. The method of claim 1, further comprising:
determining a ratio of the second test dies to the first test dies based on a consistency determination for the breakdown voltage information.

11. The method of claim 10, wherein the determining of the ratio comprises:
upon determining that the consistency determination is greater than or equal to a threshold value, increasing the ratio of the second test dies to the first test dies.

12. An apparatus for estimating a breakdown voltage of a silicon dioxide film, the apparatus comprising:
one or more semiconductor chips configured to:
control a plurality of different first test voltages to be applied to each of first test dies selected from among test dies;
generate breakdown voltage information associated with the first test dies based on respective current levels generated by each of the first test dies in response to the plurality of different first test voltages;
generate a breakdown voltage estimation model by updating a parameter of a neural network model based on the breakdown voltage information;
control a plurality of different second test voltages to be applied to each of second test dies selected from among the test dies and distinct from the first test dies, wherein the plurality of different second test voltages are selected from among the plurality of different first test voltages, and have levels lower than levels of breakdown voltages for the respective first test dies;
detect respective current levels generated by each of the second test dies in response to the plurality of different second test voltages; and
estimate breakdown voltages of the second test dies without destroying respective silicon dioxide films of the second test dies by detecting respective current levels generated by each of the second test dies in response to the plurality of different second test voltages.

13. The apparatus of claim 12, further comprising:
an interface configured to receive test data including a breakdown voltage of each of the first test dies and the current levels associated with the plurality of different first test voltages.

14. The apparatus of claim 13,
wherein the one or more semiconductor chips are further configured to generate the breakdown voltage information by filtering certain test data from the test data based on variances in the current levels associated with the plurality of different first test voltages.

15. The apparatus of claim 13,
wherein the one or more semiconductor chips are further configured to generate the breakdown voltage information by filtering certain test data from the test data based on a shape parameter of a distribution of the breakdown voltages for the first test dies.

16. The apparatus of claim 12, further comprising:
a memory storing a silicon dioxide film thickness and a die position of each of the first test dies as input data to a training data set, and storing a breakdown voltage of each of the first test dies as output data of the training data set, wherein the one or more semiconductor chips are further configured to update the parameter based on the training data set of the memory.

17. An operating method for a system estimating a breakdown voltage of a silicon dioxide film, the operating method comprising:
applying a plurality of different first test voltages to a first test die, and detecting respective current levels generated by the first test die in response to the plurality of different first test voltages;
generating breakdown voltage information associated with the first test die based on the current levels associated with the plurality of different first test voltages;
generating a breakdown voltage estimation model by updating a parameter of a neural network model based on the breakdown voltage information;
applying to a second test die, second test voltages having a lower level than a predetermined breakdown voltage, wherein the second test voltages are selected from among the plurality of different first test voltages;
reading respective current levels output from the second test die in response to the second test voltages; and
estimating a breakdown voltage of the second test die without destroying a silicon dioxide film of the second test die by inputting the respective current levels to the breakdown voltage estimation model.

18. The operating method of claim 17, further comprising:
outputting evaluation information associated with a wafer including the second test die based on the estimated breakdown voltage of the second test die.

19. The operating method of claim 17, further comprising:
generating the breakdown voltage estimation model based on a training data set generated in relation to a silicon dioxide film thickness and a die position;
generating training data as input data of the training data set; and
generating breakdown voltages of the test dies as output data of the training data set.

20. The operating method of claim 19, wherein the generating of the breakdown voltage estimation model comprises:
   filtering certain test data from test data including the breakdown voltages of the test dies.

* * * * *